United States Patent
Yamashita et al.

(10) Patent No.: US 10,569,766 B2
(45) Date of Patent: Feb. 25, 2020

(54) VEHICLE CONTROL DEVICE

(71) Applicant: MAZDA MOTOR CORPORATION, Hiroshima (JP)

(72) Inventors: Tetsuhiro Yamashita, Aki-gun (JP); Takashi Goto, HigashiHiroshima (JP); Kiyonobu Takahashi, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 114 days.

(21) Appl. No.: 15/753,812

(22) PCT Filed: Aug. 9, 2016

(86) PCT No.: PCT/JP2016/003674
§ 371 (c)(1),
(2) Date: Feb. 20, 2018

(87) PCT Pub. No.: WO2017/033425
PCT Pub. Date: Mar. 2, 2017

(65) Prior Publication Data
US 2019/0009774 A1 Jan. 10, 2019

(30) Foreign Application Priority Data
Aug. 25, 2015 (JP) .................................. 2015-166081

(51) Int. Cl.
*B60W 30/09* (2012.01)
*B60W 40/107* (2012.01)
(Continued)

(52) U.S. Cl.
CPC ............ *B60W 30/09* (2013.01); *B60R 21/00* (2013.01); *B60T 7/12* (2013.01); *B60T 7/22* (2013.01);
(Continued)

(58) Field of Classification Search
CPC .... B60W 30/09; B60W 40/107; B60W 50/12; B60W 2420/42; B60W 2420/54;
(Continued)

(56) References Cited

U.S. PATENT DOCUMENTS

| | | | |
|---|---|---|---|
| 2010/0023234 A1 | 1/2010 | Kameyama | |
| 2010/0106387 A1 | 4/2010 | Tsuchida | |
| 2014/0121933 A1* | 5/2014 | Slaton | B60W 50/085 701/93 |
| 2015/0307091 A1* | 10/2015 | Gokan | B60W 30/09 701/70 |

(Continued)

FOREIGN PATENT DOCUMENTS

| | | |
|---|---|---|
| JP | 2010-023769 A | 2/2010 |
| JP | 2012-118682 A | 6/2012 |

(Continued)

OTHER PUBLICATIONS

International Search Report issued in PCT/JP2016/003674; dated Nov. 1, 2016.

*Primary Examiner* — Sze-Hon Kong
(74) *Attorney, Agent, or Firm* — Studebaker & Brackett PC (57) ABSTRACT

Disclosed herein is a vehicle control device reducing a driving force generated by an engine of a vehicle to prevent the vehicle from colliding with a forward obstacle. The vehicle control device includes an ECU configured to control the driving force, an ultrasonic sensor configured to detect the forward obstacle in front of the vehicle, and a monocular camera configured to take an image of an area in front of the vehicle. The ECU determines the presence or absence of the forward obstacle in front of the vehicle based on the image taken with the monocular camera while the vehicle is travelling, and changes an upper limit of the driving force in accordance with a combination of whether or not the ultrasonic sensor has detected an object and the presence or absence of the forward obstacle determined based on the image taken with the monocular camera.

5 Claims, 4 Drawing Sheets

(51) Int. Cl.
*B60W 50/12* (2012.01)
*B60T 7/12* (2006.01)
*B60T 8/175* (2006.01)
*B60R 21/00* (2006.01)
*B60T 7/22* (2006.01)

(52) U.S. Cl.
CPC ........... *B60T 8/175* (2013.01); *B60W 40/107* (2013.01); *B60W 50/12* (2013.01); *B60T 2201/022* (2013.01); *B60W 2420/42* (2013.01); *B60W 2420/54* (2013.01)

(58) Field of Classification Search
CPC ... B60R 21/00; B60T 7/12; B60T 7/22; B60T 8/175; B60T 2201/022; B60T 8/107
See application file for complete search history.

(56) References Cited

U.S. PATENT DOCUMENTS

| | | | |
|---|---|---|---|
| 2015/0367731 A1* | 12/2015 | Amano | B60K 35/00 701/36 |
| 2016/0200300 A1* | 7/2016 | Ishida | B60T 8/175 701/83 |
| 2016/0347312 A1* | 12/2016 | Tomatsu | B60W 30/146 |
| 2017/0309180 A1* | 10/2017 | Baba | B60R 21/00 |
| 2018/0043885 A1* | 2/2018 | Harada | B60T 7/22 |
| 2018/0156913 A1* | 6/2018 | Baba | G01S 7/411 |
| 2018/0215381 A1* | 8/2018 | Owen | B60W 30/143 |
| 2018/0222478 A1* | 8/2018 | Limbacher | B60W 50/0097 |

FOREIGN PATENT DOCUMENTS

| | | |
|---|---|---|
| WO | 2008/153205 A1 | 12/2008 |
| WO | 2014/083787 A1 | 6/2014 |

* cited by examiner

| FORWARD OBSTACLE DETECTED BY CAMERA | TRAVEL FLAG | CAMERA DETECTION FLAG | FORWARD OBSTACLE DETECTED BY ULTRASONIC SENSOR | DETECTION LEVEL |
|---|---|---|---|---|
| ABSENT | OFF | ON | PRESENT | 3 |
|  |  |  | ABSENT | 0 |
|  |  | OFF | PRESENT | 2 |
|  |  |  | ABSENT | 0 |
|  | ON |  | PRESENT | 0 |
|  |  |  | ABSENT | 0 |
| ANOTHER VEHICLE |  |  | PRESENT | 4 |
|  |  |  | ABSENT | 1 |
| ANOTHER OBJECT |  |  | PRESENT | 4 |
|  |  |  | ABSENT | 2 |
| PEDESTRIAN |  |  |  | 4 |

VEHICLE CONTROL DEVICE

TECHNICAL FIELD

The present invention relates to a vehicle control device, and more particularly relates to a vehicle control device that reduces the driving force of a vehicle to prevent the vehicle from colliding with a forward obstacle.

BACKGROUND ART

A vehicle control device that performs so-called "unintended acceleration control" has been known. If an accelerator pedal of a subject vehicle at rest is operated by mistake, the vehicle control device restricts a rapid start and a sharp acceleration of the subject vehicle to prevent the subject vehicle from colliding with an obstacle in front of the subject vehicle.

For example, Patent Document 1 discloses a driving support controller that recognizes an obstacle extremely close to a subject vehicle based on an image taken with a monocular camera to support driving, (e.g., to control unintended acceleration). This driving support controller determines, based on the magnification of a candidate one of images which are taken while the subject vehicle is moving forward which may show an obstacle, whether or not the candidate image shows an obstacle, and thus recognizes the obstacle.

CITATION LIST

Patent Documents

[Patent Document 1] Japanese Unexamined Patent Publication No. 2012-118682

SUMMARY

Technical Problem

To detect an obstacle in front of a vehicle with a monocular camera just like the driving support controller of Patent Document 1, the vehicle has to be moved forward. This makes it difficult to detect a forward obstacle based on only images taken with the monocular camera if no image taken while the vehicle is moving forward is obtained (e.g., immediately after an ignition switch is turned on).

On the other hand, even if no image taken while the vehicle is moving forward is obtained, a stereo camera, for example, may be used to detect a forward obstacle. This, however, increases the device cost.

The present invention has been made to solve the conventional problems described above. It is therefore an object of the present invention to provide a vehicle control device that can prevent cost from increasing too much, and can reliably prevent a vehicle from colliding with a forward obstacle even if the forward obstacle is hardly detected based on only images taken with a monocular camera.

Solution to the Problem

To achieve the object, a vehicle control device according to the present invention is directed to a vehicle control device reducing a driving force generated by a power source of a vehicle to prevent the vehicle from colliding with a forward obstacle. The device includes: a driving force controller configured to control the driving force generated by the power source of the vehicle; a detector configured to detect the forward obstacle in front of the vehicle; a monocular camera configured to take an image of an area in front of the vehicle; and an obstacle determining unit configured to determine presence or absence of the forward obstacle in front of the vehicle, based on an image taken with the monocular camera while the vehicle is travelling. The driving force controller changes an upper limit of the driving force generated by the power source in accordance with a combination of whether or not the detector has detected an object and presence or absence of the forward obstacle determined by the obstacle determining unit.

According to such a configuration of the present invention, the driving force controller changes the upper limit of the driving force generated by the power source in accordance with a combination of whether or not the detector has detected an object and the presence or absence of a forward obstacle determined based on the image taken with the monocular camera. Thus, the upper limit of the driving force can be set in accordance with the probability of the presence of a forward obstacle estimated based on a combination of the presence or absence of a forward obstacle determined based on the image taken with the monocular camera and whether or not the detector has detected an object. This can substantially prevent the cost from increasing too much, using a combination of the detector and the monocular camera, which are relatively inexpensive, and can reliably prevent the vehicle from colliding with a forward obstacle even when a forward obstacle is hardly detected based on only the images taken with the monocular camera.

In a preferred embodiment of the present invention, the obstacle determining unit determines a type of the forward obstacle in front of the vehicle, based on the image taken with the monocular camera while the vehicle is travelling, and the driving force controller changes the upper limit of the driving force generated by the power source in accordance with a combination of whether or not the detector has detected an object and the type of the forward obstacle determined by the obstacle determining unit.

According to such a configuration of the present invention, the driving force controller changes the upper limit of the driving force in accordance with a combination of whether or not the detector has detected an object and the type of the forward obstacle determined based on the image taken with the monocular camera. Thus, the upper limit of the driving force can be set in accordance with the probability of the presence of a forward obstacle estimated with consideration given not only to the combination of the presence or absence of a forward obstacle determined based on the image taken with the monocular camera and whether or not the detector has detected an object but also to the type of the forward obstacle. This can more reliably prevent the vehicle from colliding with a forward obstacle even when a forward obstacle is hardly detected based on only the image taken with the monocular camera.

In another preferred embodiment of the present invention, the vehicle control device further includes: a determination memory configured to store a last result of a determination made by the obstacle determining unit when an ignition switch of the vehicle is turned off. The driving force controller changes the upper limit of the driving force generated by the power source in accordance with a combination of whether or not the detector has detected an object, the presence or absence of the forward obstacle determined by the obstacle determining unit, and the result of the determination which is made by the obstacle determining unit, the result being stored in the determination memory.

According to such a configuration of the present invention, the driving force controller changes the upper limit of the driving force in accordance with a combination of whether or not the detector has detected an object, the presence or absence of a forward obstacle determined based on the image taken with the monocular camera, and the presence or absence of a forward obstacle determined based on the image taken with the monocular camera when the ignition switch was turned off at the previous time. Thus, the upper limit of the driving force can be set in accordance with the probability of the presence of a forward obstacle estimated with consideration given not only to the combination of the presence or absence of a forward obstacle determined based on the image taken with the monocular camera and whether or not the detector has detected an object but also whether or not a forward obstacle had been detected when the ignition switch was turned off at the previous time. This can more reliably prevent the vehicle from colliding with a forward obstacle even when a forward obstacle is hardly detected based on only the image taken with the monocular camera.

In still another preferred embodiment of the present invention, if the obstacle determining unit determines that there is no forward obstacle, the driving force controller changes the upper limit of the driving force generated by the power source in accordance with a combination of whether or not the detector has detected an object and the result of the determination which is made by the obstacle determining unit, the result being stored in the determination memory, and if the obstacle determining unit determines that there is a forward obstacle, the driving force controller changes the driving force generated by the power source in accordance with what the detector has detected, irrespective of the result of the determination which is made by the obstacle determining unit, the result being stored in the determination memory.

According to such a configuration of the present invention, if a determination is made, based on the image taken with the monocular camera, that there is no forward obstacle, the driving force controller changes the upper limit of the driving force in accordance with a combination of whether or not the detector has detected an object, the presence or absence of a forward obstacle determined based on the image taken with the monocular camera, and the presence or absence of a forward obstacle determined based on the image taken with the monocular camera when the ignition switch was turned off at the previous time. Thus, when a forward obstacle is not detected based on the image taken with the monocular camera, the upper limit of the driving force can be set in accordance with the probability of the presence of a forward obstacle estimated with consideration given also to the presence or absence of a forward obstacle determined based on the image taken with the monocular camera when the ignition switch was turned off at the previous time. This can more reliably prevent the vehicle from colliding with a forward obstacle.

In yet another preferred embodiment of the present invention, the vehicle control device further includes a travel history memory configured to store presence or absence of a history of the vehicle's travel at speeds higher than or equal to a predetermined speed. The driving force controller changes the upper limit of the driving force generated by the power source in accordance with a combination of whether or not the detector has detected an object, the presence or absence of the forward obstacle determined by the obstacle determining unit, and the presence or absence of the history of the vehicle's travel at the speeds higher than or equal to the predetermined speed, the history being stored in the travel history memory.

According to such a configuration of the present invention, the driving force controller changes the upper limit of the driving force in accordance with a combination of whether or not the detector has detected an object, the presence or absence of a forward obstacle determined based on the image taken with the monocular camera, and the presence or absence of the history of the vehicle's travel at the speeds higher than or equal to the predetermined vehicle speed after the ignition switch is last turned off. Thus, the probability of the presence of a forward obstacle can be estimated based on the presence or absence of the history of the vehicle's travel at the speeds higher than or equal to the predetermined vehicle speed after the ignition switch is last turned on, with consideration given to whether or not a forward obstacle is hardly detected based on only the image taken with the monocular camera, and the upper limit of the driving force can be set in accordance with the estimated probability. This can more reliably prevent the vehicle from colliding with a forward obstacle.

In a further preferred embodiment of the present invention, if the obstacle determining unit determines that there is no forward obstacle, the driving force controller changes the upper limit of the driving force generated by the power source in accordance with a combination of whether or not the detector has detected an object and the presence or absence of the history of the vehicle's travel at the speeds higher than or equal to the predetermined speed, the history being stored in the travel history memory, and if the obstacle determining unit determines that there is a forward obstacle, the driving force controller changes the driving force generated by the power source in accordance with whether or not the detector has detected an object, irrespective of the presence or absence of the history of the vehicle's travel at the speeds higher than or equal to the predetermined speed, the history being stored in the travel history memory.

According to such a configuration of the present invention, if a determination is made, based on the image taken with the monocular camera, that there is no forward obstacle, the driving force controller changes the upper limit of the driving force in accordance with a combination of whether or not the detector detects an object, the presence or absence of a forward obstacle determined based on the image taken with the monocular camera, and the presence or absence of the history of the vehicle's travel at the speeds higher than or equal to the predetermined vehicle speed after the ignition switch is last turned on. Thus, when a forward obstacle is not detected based on the image taken with the monocular camera, the probability of the presence of a forward obstacle can be estimated with consideration given to the presence or absence of the history of the vehicle's travel at the speeds higher than or equal to the predetermined vehicle speed, which history is associated with the accuracy with which a forward obstacle is detected based on the image taken with the monocular camera, and the upper limit of the driving force can be set in accordance with the estimated probability. This can more reliably prevent the vehicle from colliding with a forward obstacle.

Advantages of the Invention

A vehicle control device according to the present invention can substantially prevent the cost from increasing too much, and can reliably prevent a vehicle from colliding with a forward obstacle even when a forward obstacle is hardly detected based on only an image taken with a monocular camera.

DESCRIPTION OF EMBODIMENTS

A vehicle control device according to an embodiment of the present invention will now be described with reference to the attached drawings.

Figure 1:
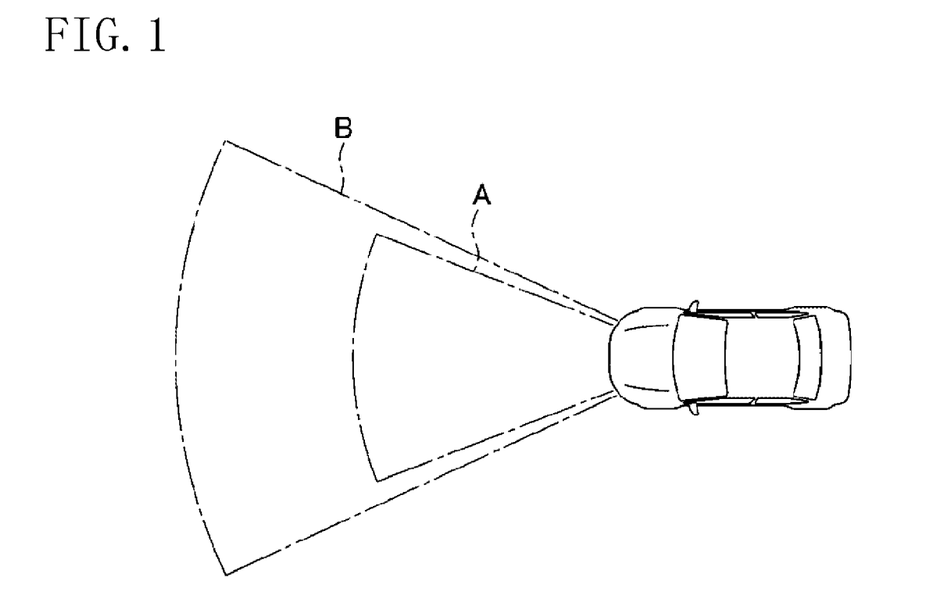
FIG. 1 is a conceptual diagram showing ranges detectable by various sensors of a vehicle including a vehicle control device according to an embodiment of the present invention.
Figure 2:
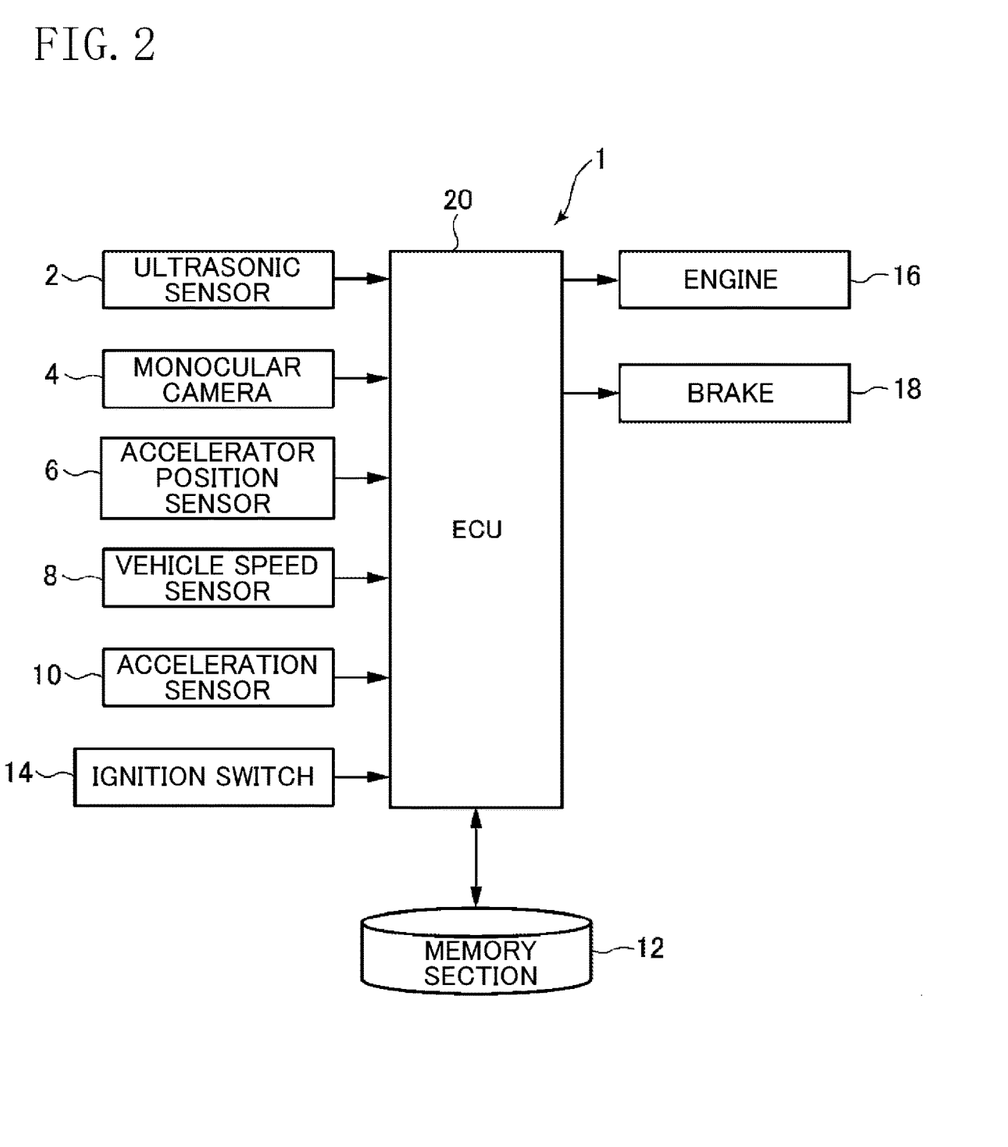
FIG. 2 is a block diagram showing a system configuration for the vehicle control device according to the embodiment of the present invention.

First, a vehicle including the vehicle control device according to the embodiment of the present invention will be described with reference to FIGS. 1 and 2. FIG. 1 is a conceptual diagram showing ranges detectable by various sensors of a vehicle including the vehicle control device according to the embodiment of the present invention. FIG. 2 is a block diagram showing a system configuration for the vehicle control device according to the embodiment of the present invention.

First, the vehicle control device according to the embodiment of the present invention performs pre-crash safety (PCS) control, which includes unintended acceleration control. The unintended acceleration control is performed to reduce the output of an engine to prevent a rapid start of a subject vehicle if an obstacle is present in front of a subject vehicle at rest, which has an accelerator pedal depressed to a degree higher than or equal to a fixed degree. This unintended acceleration control is started when an ignition switch of the vehicle is turned on. Unless a driver operates to stop the control, this control is continued.

The vehicle including the vehicle control device according to this embodiment includes an ultrasonic sensor that detects the distance between the vehicle and a forward obstacle in front of the vehicle.

The ultrasonic sensor is used mainly for unintended acceleration control, collision avoidance control, and other control modes, emits an ultrasonic wave toward an angular range A in front of the vehicle as illustrated in FIG. 1, and detects the distance between the vehicle and a forward obstacle, such as a preceding vehicle or a pedestrian, based on the difference in time between the emission of the ultrasonic wave and the reception of a reflected wave from a target object. The ultrasonic sensor is capable of detecting, for example, a forward obstacle within about 5 m ahead of the vehicle.

The vehicle further includes a monocular camera that obtains an image in front of the vehicle. The monocular camera is used mainly for unintended acceleration control, lane departure warning, and other systems, and takes an image of an angular range B in front of the vehicle as illustrated in FIG. 1. The distance between the vehicle and a forward obstacle, such as a preceding vehicle or a pedestrian, is estimated based on the image taken with the monocular camera while the vehicle is travelling.

Next, as shown in FIG. 2, the reference numeral 1 denotes the vehicle control device according to this embodiment. This vehicle control device 1 includes the ultrasonic sensor 2 and the monocular camera 4 both described above, an accelerator position sensor 6, a vehicle speed sensor 8, an acceleration sensor 10, and a memory section 12. The accelerator position sensor 6 detects the accelerator position. The vehicle speed sensor 8 detects the vehicle speed. The accelerator position sensor 10 detects accelerations acting on the vehicle in various directions. The memory section 12 stores information for use to control the vehicle.

The vehicle control device 1 further includes an electric control unit (ECU) 20, which controls an engine 16 and a brake 18 both for the vehicle based on signals received from the various sensors, the memory section 12, and an ignition switch 14 of the vehicle. The various sensors include the ultrasonic sensor 2, the monocular camera 4, the accelerator position sensor 6, the vehicle speed sensor 8, and the acceleration sensor 10.

The ECU 20 is configured as a computer including a central processing unit (CPU), various programs interpreted and executed by the CPU (including a basic control program, such as an operating system (OS), and an application launched by the OS to achieve a specific function), and an internal memory, such as a read-only memory (ROM) or a random access memory (RAM), for storing programs and various data.

Figure 3:
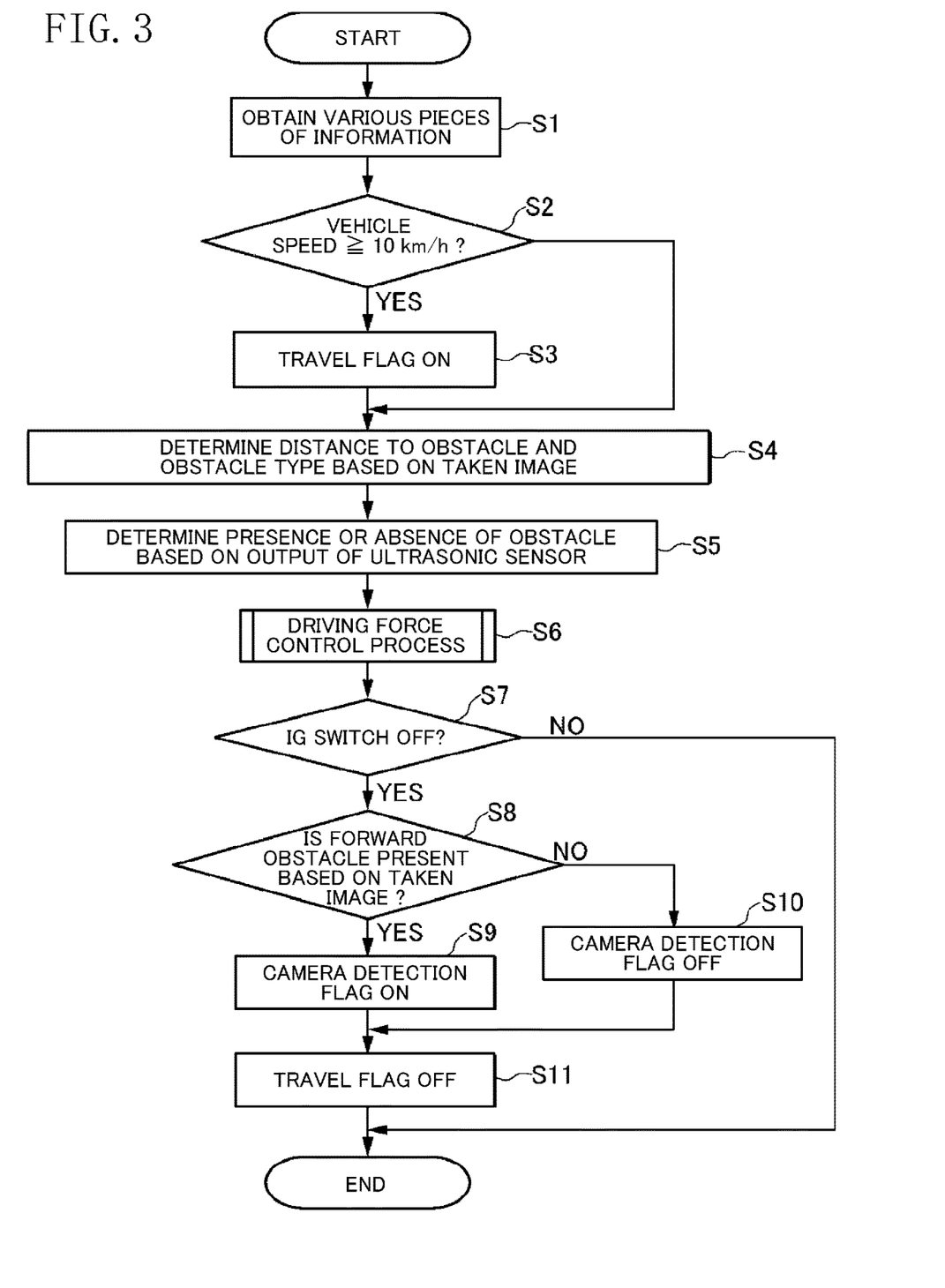
FIG. 3 is a flowchart of an unintended acceleration control process performed by the vehicle control device according to the embodiment of the present invention.
Figure 4:
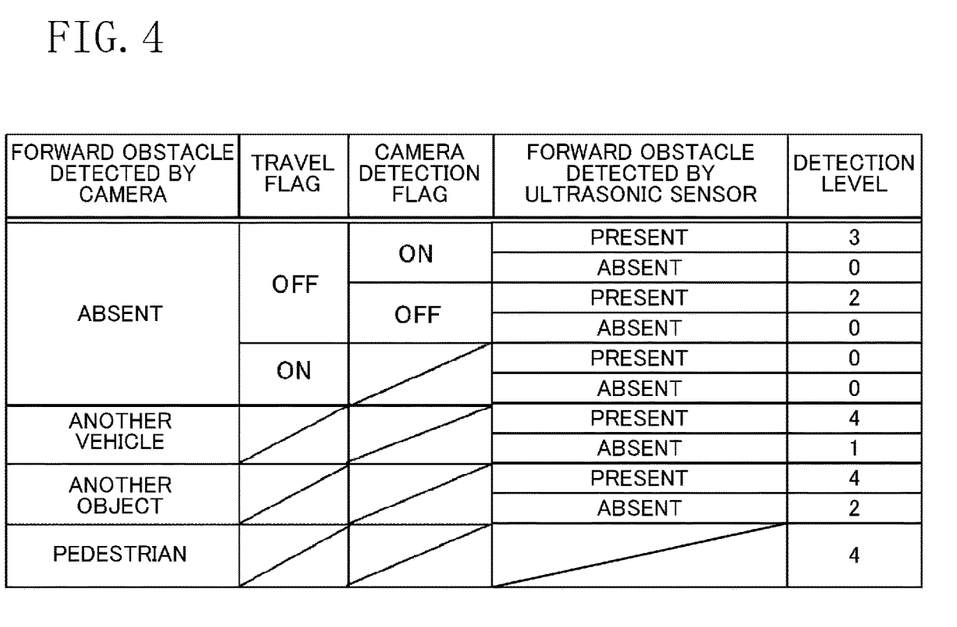
FIG. 4 is a control table to be referred to in the unintended acceleration control process by the vehicle control device according to the embodiment of the present invention.

Next, what and how the vehicle control device 1 according to the embodiment of the present invention controls will be described with reference to FIGS. 3 and 4. FIG. 3 is a flowchart of an unintended acceleration control process performed by the vehicle control device 1 according to the embodiment of the present invention. FIG. 4 is a control table to be referred to in an unintended acceleration control process by the vehicle control device 1 according to the embodiment of the present invention.

If the ignition switch 14 of the vehicle is turned on, and the power of the ECU 20 is turned on, the unintended acceleration control process shown in FIG. 3 is started and repeatedly performed.

As shown in FIG. 3, after the unintended acceleration control process is started, the ECU 20 obtains information output from the various sensors and information stored in the memory section 12 in step S1. Examples of the information obtained by the ECU 20 in this step include the outputs of the ultrasonic sensor 2, images taken with the monocular camera 4, the vehicle speeds output by the vehicle speed sensor 8, and values of a travel flag and a camera detection flag stored in the memory section 12 and described below.

Next, in step S2, the ECU 20 determines whether or not the present vehicle speed is higher than or equal to a predetermined vehicle speed (e.g., 10 km/h).

If the vehicle speed is higher than or equal to the predetermined vehicle speed, the process proceeds to step S3. In step S3, the ECU 20 sets the value of the travel flag to ON. The travel flag indicates the presence or absence of a history of the vehicle's travel at speeds higher than or equal to the predetermined vehicle speed after the ignition switch 14 of the vehicle is last turned on. When the ignition switch 14 is turned on, the initial value of the travel flag is set to OFF. If the vehicle speed becomes higher than or equal to the predetermined vehicle speed, and the value of the travel flag is set to ON, then the value is kept ON until the ignition switch 14 is turned off.

After step S3, or if, in step S2, the present vehicle speed is not higher than or equal to the predetermined vehicle speed (lower than the predetermined vehicle speed), the process proceeds to step S4. In step S4, the ECU 20 determines the distance between the vehicle and an obstacle in front of the vehicle and the type of the obstacle, based on the image taken with the monocular camera 4. For example, the ECU 20 calculates the distances to obstacles included in images taken with the monocular camera 4 within a predetermined period of time, based on these images and the distance over which the vehicle travels while these images are taken, and determines the types of the obstacles based on the outlines of target objects and other factors. If the distance to a target object included in one of the taken images is 4 m or shorter, the ECU 20 determines that the target object is an obstacle in front of the vehicle. If no target object is located within 4 m ahead of the vehicle, the ECU 20 determines that there is no obstacle in front of the vehicle.

Next, in step S5, the ECU 20 determines the presence or absence of an obstacle in front of the vehicle, based on a value output from the ultrasonic sensor 2. For example, the ECU 20 determines the distance between the vehicle and a forward obstacle, based on the difference between the time when the ultrasonic sensor 2 emits an ultrasonic wave and the time when a reflected wave from the target object is received. If the determined distance is 4 m or shorter, the ECU 20 determines that there is a forward obstacle.

Next, in step S6, the ECU 20 performs a driving force control process, based on the various pieces of information obtained in step S1, the distance between the vehicle and the forward obstacle and the type of the obstacle both determined based on the images taken with the monocular camera 4 in step S4, and the presence or absence of an obstacle determined based on the value output from the ultrasonic sensor 2 in step S5.

In this driving force control process, the ECU 20 sets a value of a limit torque TL based on the various pieces of information obtained in step S1, the distance between the vehicle and the obstacle in front of the vehicle and the type of the obstacle both determined based on the images taken with the monocular camera 4 in step S4, and the presence or absence of an obstacle determined based on the value output from the ultrasonic sensor 2 in step S5. When a required torque determined in accordance with the accelerator position output from the accelerator position sensor 6 is output by the engine 16, the actual output torque is reduced to the set limit torque TL or lower. In other words, the upper limit of the torque output by the engine 16 is the limit torque TL. The detailed setting of the limit torque TL will be described below.

If no forward obstacle is then detected due to the backward movement of the vehicle or any other reason, or if the accelerator position has been greater than or equal to a predetermined value for a fixed period of time (i.e., if a driver may intentionally operate the accelerator pedal), the ECU 20 terminates the driving force control process.

After step S6, in step S7, the ECU 20 determines whether or not the ignition switch 14 of the vehicle has been turned off. If the ignition switch 14 has been turned off, the process proceeds to step S8. In step S8, the ECU 20 determines the presence or absence of an obstacle in front of the vehicle, based on the images taken with the monocular camera 4 immediately before the ignition switch 14 is turned off.

If there is an obstacle in front of the vehicle, the process proceeds to step S9. In step S9, the ECU 20 sets a value of a camera detection flag to ON. The camera detection flag indicates the last result of determining the presence or absence of an obstacle in front of the vehicle based on the images taken with the camera.

On the other hand, if there is no obstacle in front of the vehicle, the process proceeds to step S10. In step S10, the ECU 20 sets the value of the camera detection flag to OFF.

After step S9 or S10, the process proceeds to step S11. In step S11, the ECU 20 resets the value of the travel flag to OFF.

If, after step S11 or in step S7, the ignition switch 14 of the vehicle has not been turned off, the ECU 20 terminates the unintended acceleration control process.

The detailed setting of the limit torque TL in the driving force control process in step S6 will now be described with reference to FIG. 4.

As shown in FIG. 4, in the driving force control process of step S6, the ECU 20 sets a "detection level" in accordance with a combination of the distance between the vehicle and the obstacle in front of the vehicle and the type of the obstacle both determined based on the images taken with the monocular camera 4, the travel flag, the camera detection flag, and the presence or absence of an obstacle determined based on the value output from the ultrasonic sensor 2. The "detection level" indicates the probability of the presence of a forward obstacle to be subjected to the unintended acceleration control. The ECU 20 further sets the value of the limit torque TL in accordance with the set detection level.

In the example shown in FIG. 4, the detection level is defined by any one of five integral values 0 to 4. The greater the value is, the more likely there is a forward obstacle. Specifically, if the detection level is zero, there is no forward obstacle to be subjected to the unintended acceleration control. The higher the detection level is, the more likely there is a forward obstacle to be subjected to the unintended acceleration control. A situation where the detection level is four shows that there is certainly a forward obstacle to be subjected to the unintended acceleration control.

First, a description will be given of a situation where in step S4 which is shown in FIG. 3 and in which the unintended acceleration control process is performed, a determination is made, based on the images taken with the monocular camera 4, that there is an obstacle in front of the vehicle, and the travel flag is OFF. In this situation, it may be difficult to determine the presence or absence of a forward obstacle based on only the images taken with the monocular camera 4, because there is no history of the vehicle's travel at speeds higher than or equal to the predetermined vehicle speed after the ignition switch 14 of the vehicle is last turned on.

In this situation, if the camera detection flag is ON, and in step S5 in which the unintended acceleration control process is performed, a determination is made, based on the value output from the ultrasonic sensor 2, that there is a forward obstacle, although a determination has been made, based on the images taken with the monocular camera 4, that there is no forward obstacle, it may be highly likely that there is a forward obstacle, and the ECU 20 thus sets the detection level to three. This is because a forward obstacle had been detected when the ignition switch 14 was turned off at the previous time, and the ultrasonic sensor 2 has detected a forward obstacle.

If the camera detection flag is OFF, and in step S5 in which the unintended acceleration control process is performed, a determination is made, based on the value output from the ultrasonic sensor 2, that there is a forward obstacle, there may be a forward obstacle, and the ECU 20 thus sets the detection level to two. This is because, although no forward obstacle had been detected when the ignition switch 14 was turned off at the previous time, the ultrasonic sensor 2 has detected a forward obstacle.

On the other hand, if, in step S5 in which the unintended acceleration control process is performed, a determination is made, based on the value output from the ultrasonic sensor 2, that there is no forward obstacle, there may be no forward obstacle. This is because a forward obstacle has been neither detected based on the images taken with the monocular camera 4 nor detected by the ultrasonic sensor 2. In this case, the ECU 20 sets the detection level to zero irrespective of the value of the camera detection flag.

Next, a description will be given of a situation where in step S4 which is shown in FIG. 3 and in which the unintended acceleration control process is performed, a determination is made, based on the images taken with the monocular camera 4, that there is an obstacle in front of the vehicle, and the travel flag is ON. In this situation, no forward obstacle may be present. This is because, in a situation where there is a history of the vehicle's travel at speeds higher than or equal to the predetermined vehicle speed after the ignition switch 14 of the vehicle is last turned on, and the presence or absence of a forward obstacle can be accurately determined based on the images taken with the monocular camera 4, a determination has been made, based on the images taken with the monocular camera 4, that there is no forward obstacle. In this case, the ECU 20 sets the detection level to zero irrespective of the value of the camera detection flag and whether or not the ultrasonic sensor 2 has detected a forward obstacle.

Next, a description will be given of a situation where in step S4 which is shown in FIG. 3 and in which the unintended acceleration control process is performed, a determination is made, based on the images taken with the monocular camera 4, that there is a forward obstacle, and the obstacle is classified as another vehicle. In this situation, a forward obstacle has been detected based on the images taken with the monocular camera 4. Thus, consideration does not have to be given to a history of the vehicle's travel at speeds higher than or equal to the predetermined vehicle speed after the ignition switch 14 is last turned on, and whether or not a forward obstacle had been detected when the ignition switch 14 was turned off at the previous time. However, if a target object included in one of the images taken with the monocular camera 4 is another moving vehicle, the accuracy with which the distance to the another vehicle is detected deceases. Thus, even if the distance to the another vehicle is longer than 4 m, the another vehicle may be determined, by mistake, to be a forward obstacle.

In this situation, if, in step S5 in which the unintended acceleration control process is performed, a determination is made, based on the value output from the ultrasonic sensor 2, that there is a forward obstacle, there may be a forward obstacle. This is because a forward obstacle has been either detected based on the images taken with the monocular camera 4 or detected by the ultrasonic sensor 2. In this case, the ECU 20 sets the detection level to four.

On the other hand, if, in step S5 in which the unintended acceleration control process is performed, a determination is made, based on the value output from the ultrasonic sensor 2, that there is no forward obstacle, another vehicle more distant than the location that is 4 m ahead of the vehicle may be determined, by mistake, to be a forward obstacle as described above, and a forward obstacle may be less likely to be present. Thus, the ECU 20 sets the detection level to one.

Next, a description will be given of a situation where in step S4 which is shown in FIG. 3 and in which the unintended acceleration control process is performed, a determination is made, based on the images taken with the monocular camera 4, that there is a forward obstacle, and the obstacle is classified as another object (i.e., neither another vehicle nor a pedestrian). In this situation, a forward obstacle has been detected based on the images taken with the monocular camera 4. Thus, consideration does not have to be given to a history of the vehicle's travel at speeds higher than or equal to the predetermined vehicle speed after the ignition switch 14 is last turned on, and whether or not a forward obstacle had been detected when the ignition switch 14 was turned off at the previous time.

In this situation, if, in step S5 in which the unintended acceleration control process is performed, a determination is made, based on the value output from the ultrasonic sensor 2, that there is a forward obstacle, there may be a forward obstacle. This is because a forward obstacle has been either detected based on the images taken with the monocular camera 4 or detected by the ultrasonic sensor 2. In this case, the ECU 20 sets the detection level to four irrespective of the values of the travel flag and camera detection flag.

On the other hand, if, in step S5 in which the unintended acceleration control process is performed, a determination is made, based on the value output from the ultrasonic sensor 2, that there is no forward obstacle, a forward obstacle is detected based on the images taken with the monocular camera 4, and it is thus undeniable that a forward obstacle may be present. Thus, the ECU 20 sets the detection level to two.

Next, a description will be given of a situation where in step S4 which is shown in FIG. 3 and in which the unintended acceleration control process is performed, a determination is made, based on the images taken with the monocular camera 4, that there is a forward obstacle, and the obstacle is classified as a pedestrian.

In this situation, the vehicle has to be reliably prevented from colliding with a pedestrian. Thus, the ECU 20 sets the detection level to four irrespective of the value of the travel flag, the value of the camera detection flag, and whether or not the ultrasonic sensor 2 has detected a forward obstacle.

The ECU 20 sets the value of the limit torque TL so that this value becomes lower as the detection level becomes higher. For example, if the detection level is four, the ECU 20 sets the limit torque TL to a value corresponding to the torque required when the accelerator position is 20%. That is to say, even if, while a forward obstacle is present, the accelerator position exceeds 20%, the ECU 20 limits the torque generated by the engine 16 to the torque required when the accelerator position is 20%.

Likewise, if the detection level is three, the ECU 20 sets the limit torque TL to a value corresponding to the torque required when the accelerator position is 40%. If the detection level is two, the ECU 20 sets the limit torque TL to a value corresponding to the torque required when the accelerator position is 60%. If the detection level is one, the ECU 20 sets the limit torque TL to a value corresponding to the torque required when the accelerator position is 80%. On the other hand, if the detection level is zero, the ECU 20 does not set the limit torque TL. That is to say, the ECU 20 controls the engine 16 so that the engine 16 outputs the required torque determined in accordance with the accelerator position as it is.

Next, a further variation of the embodiment of the present invention will be described.

In the foregoing embodiment of the present invention, a situation where the ultrasonic sensor 2 is used as a detector that detects the distance between the vehicle and the obstacle in front of the vehicle has been described as an example. However, a detector, such as an infrared sensor or a laser sensor, may be used, and the ECU 20 may set the value of the limit torque TL in accordance with a combination of whether or not the detector has detected an object and the presence or absence of a forward obstacle determined based on the images taken with the monocular camera 4.

In the foregoing embodiment of the present invention, a situation where the power source of the vehicle is the engine 16 has been described as an example. However, the power source of the vehicle may be a motor.

Next, operational advantages of the vehicle control device 1 according to each of the foregoing embodiment of the present invention and the variation of the embodiment of the present invention will be described.

First, the ECU 20 changes the limit torque TL, which is an upper limit of the driving force generated by the engine 16, in accordance with a combination of whether or not the ultrasonic sensor 2 has detected an object and the presence or absence of a forward obstacle determined based on the images taken with the monocular camera 4. Thus, the limit torque TL can be set in accordance with the probability of the presence of a forward obstacle, which is estimated based on the combination of the presence or absence of a forward obstacle determined based on the images taken with the monocular camera 4 and whether or not the ultrasonic sensor 2 has detected an object. This can substantially prevent the cost from increasing too much, using a combination of the ultrasonic sensor 2 and the monocular camera 4, which are relatively inexpensive, and can reliably prevent the vehicle from colliding with a forward obstacle even when a forward obstacle is hardly detected based on only the images taken with the monocular camera 4.

The ECU 20 changes the limit torque TL in accordance with a combination of whether or not the ultrasonic sensor 2 has detected an object and the type of a forward obstacle determined based on the images taken with the monocular camera 4. Thus, the limit torque TL can be set in accordance with the probability of the presence of a forward obstacle, which is estimated with consideration given not only to the combination of the presence or absence of a forward obstacle determined based on the images taken with the monocular camera 4 and whether or not the ultrasonic sensor 2 has detected an object but also to the type of the forward obstacle. This can more reliably prevent the vehicle from colliding with a forward obstacle even when a forward obstacle is hardly detected based on only the images taken with the monocular camera 4.

The ECU 20 changes the limit torque TL in accordance with a combination of whether or not the ultrasonic sensor 2 has detected an object, the presence or absence of a forward obstacle determined based on the images taken with the monocular camera 4, and the presence or absence of a forward obstacle determined based on the images taken with the monocular camera 4 when the ignition switch 14 was turned off at the previous time. Thus, the limit torque TL can be set in accordance with the probability of the presence of a forward obstacle estimated with consideration given not only to the combination of the presence or absence of a forward obstacle determined based on the images taken with the monocular camera 4 and whether or not the ultrasonic sensor 2 has detected an object but also whether or not a forward obstacle had been detected when the ignition switch 14 was turned off at the previous time. This can more reliably prevent the vehicle from colliding with a forward obstacle even when a forward obstacle is hardly detected based on only the images taken with the monocular camera 4.

In particular, if a determination is made, based on the images taken with the monocular camera 4, that there is no forward obstacle, the ECU 20 changes the limit torque TL in accordance with a combination of whether or not the ultrasonic sensor 2 has detected an object, the presence or absence of a forward obstacle determined based on the images taken with the monocular camera 4, and the presence or absence of a forward obstacle determined based on the images taken with the monocular camera 4 when the ignition switch 14 was turned off at the previous time. Thus, when a forward obstacle is not detected based on the images taken with the monocular camera 4, the limit torque TL can be set in accordance with the probability of the presence of a forward obstacle estimated with consideration given also to the presence or absence of a forward obstacle determined based on the images taken with the monocular camera 4 when the ignition switch 14 was turned off at the previous time. This can more reliably prevent the vehicle from colliding with a forward obstacle.

The ECU 20 changes the limit torque TL in accordance with a combination of whether or not the ultrasonic sensor 2 has detected an object, the presence or absence of a forward obstacle determined based on the images taken with the monocular camera 4, and the presence or absence of a history of the vehicle's travel at speeds higher than or equal to the predetermined vehicle speed after the ignition switch 14 is last turned on. Thus, the probability of the presence of a forward obstacle is estimated based on the presence or absence of a history of the vehicle's travel at speeds higher than or equal to the predetermined vehicle speed after the ignition switch 14 is last turned on, with consideration given to whether or not a forward obstacle is hardly detected based on only the images taken with the monocular camera 4, and the limit torque TL can be set in accordance with the estimated probability. This can more reliably prevent the vehicle from colliding with a forward obstacle.

In particular, if a determination is made, based on the images taken with the monocular camera 4, that there is no forward obstacle, the ECU 20 changes the limit torque TL in accordance with a combination of whether or not the ultrasonic sensor 2 has detected an object, the presence or absence of a forward obstacle determined based on the images taken with the monocular camera 4, and the presence or absence of a history of the vehicle's travel at speeds higher than or equal to the predetermined vehicle speed after the ignition switch 14 was turned on at the previous time. Thus, in a situation where a forward obstacle has not been detected based on the images taken with the monocular camera 4, the probability of the presence of a forward obstacle can be estimated with consideration given also to the presence or absence of a history of the vehicle's travel at speeds higher than or equal to the predetermined vehicle speed, which history is associated with the accuracy with which a forward obstacle is detected based on the images taken with the monocular camera 4, and the limit torque TL can be set in accordance with the estimated probability. This can more reliably prevent the vehicle from colliding with a forward obstacle.

DESCRIPTION OF REFERENCE CHARACTERS

1 Vehicle Control Device
2 Ultrasonic Sensor (Detector)
4 Monocular Camera

6 Accelerator Position Sensor
8 Vehicle Speed Sensor
10 Acceleration Sensor
12 Memory Section (Determination Memory, Travel History Memory)
14 Ignition Switch
16 Engine
18 Brake
20 ECU (Driving Force Controller, Obstacle Determining Unit)

The invention claimed is:

1. A vehicle control device reducing a driving force generated by a power source of a vehicle to prevent the vehicle from colliding with a forward obstacle, the device comprising:
    a driving force controller configured to control the driving force generated by the power source of the vehicle;
    a detector configured to detect the forward obstacle in front of the vehicle;
    a monocular camera configured to take an image of an area in front of the vehicle;
    an obstacle determining unit configured to determine presence or absence of the forward obstacle in front of the vehicle, based on an image taken with the monocular camera while the vehicle is travelling, and
    a travel history memory configured to store presence or absence of a history of the vehicle's travel at speeds higher than or equal to a predetermined speed, wherein
    the driving force controller changes an upper limit of the driving force generated by the power source in accordance with a combination of whether or not the detector has detected an object and presence or absence of the forward obstacle determined by the obstacle determining unit, and
    the driving force controller changes the upper limit of the driving force generated by the power source in accordance with a combination of whether or not the detector has detected an object, the presence or absence of the forward obstacle determined by the obstacle determining unit, and the presence or absence of the history of the vehicle's travel at the speeds higher than or equal to the predetermined speed, the history being stored in the travel history memory.

2. The vehicle control device of claim 1, wherein
    the obstacle determining unit determines a type of the forward obstacle in front of the vehicle, based on the image taken with the monocular camera while the vehicle is travelling, and
    the driving force controller changes the upper limit of the driving force generated by the power source in accordance with a combination of whether or not the detector has detected an object and the type of the forward obstacle determined by the obstacle determining unit.

3. The vehicle control device of claim 1, further comprising
    a determination memory configured to store a last result of a determination made by the obstacle determining unit when an ignition switch of the vehicle is turned off, wherein the driving force controller changes the upper limit of the driving force generated by the power source in accordance with a combination of whether or not the detector has detected an object, the presence or absence of the forward obstacle determined by the obstacle determining unit, and the result of the determination made by the obstacle determining unit, the result being stored in the determination memory.

4. The vehicle control device of claim 3, wherein
    if the obstacle determining unit determines that there is no forward obstacle, the driving force controller changes the upper limit of the driving force generated by the power source in accordance with a combination of whether or not the detector has detected an object and the result of the determination which is made by the obstacle determining unit, the result being stored in the determination memory, and
    if the obstacle determining unit determines that there is a forward obstacle, the driving force controller changes the driving force generated by the power source in accordance with whether or not the detector has detected an object, irrespective of the result of the determination made by the obstacle determining unit, the result being stored in the determination memory.

5. The vehicle control device of claim 1, wherein
    if the obstacle determining unit determines that there is no forward obstacle, the driving force controller changes the upper limit of the driving force generated by the power source in accordance with a combination of whether or not the detector has detected an object and the presence or absence of the history of the vehicle's travel at the speeds higher than or equal to the predetermined speed, the history being stored in the travel history memory, and
    if the obstacle determining unit determines that there is a forward obstacle, the driving force controller changes the driving force generated by the power source in accordance with whether or not the detector has detected an object, irrespective of the presence or absence of the history of the vehicle's travel at the speeds higher than or equal to the predetermined speed, the history being stored in the travel history memory.

* * * * *